(12) United States Patent
So et al.

(10) Patent No.: US 10,167,423 B2
(45) Date of Patent: Jan. 1, 2019

(54) GRANULATED SLAG PRODUCTS AND PROCESSES FOR THEIR PRODUCTION

(71) Applicant: HATCH LTD., Mississauga (CA)

(72) Inventors: Lai Chi So, Toronto (CA); Santiago Faucher, Oakville (CA)

(73) Assignee: HATCH LTD., Mississauga, Ontario (CA)

( * ) Notice: Subject to any disclaimer, the term of this patent is extended or adjusted under 35 U.S.C. 154(b) by 0 days.

(21) Appl. No.: 15/315,766

(22) PCT Filed: Mar. 20, 2015

(86) PCT No.: PCT/CA2015/050209
§ 371 (c)(1),
(2) Date: Dec. 2, 2016

(87) PCT Pub. No.: WO2015/184532
PCT Pub. Date: Dec. 10, 2015

(65) Prior Publication Data
US 2017/0121595 A1 May 4, 2017

Related U.S. Application Data

(60) Provisional application No. 62/007,180, filed on Jun. 3, 2014.

(51) Int. Cl.
C04B 5/00 (2006.01)
C04B 5/06 (2006.01)
(Continued)

(52) U.S. Cl.
CPC ............ C09K 8/805 (2013.01); B01J 23/78 (2013.01); C04B 5/00 (2013.01); C04B 5/065 (2013.01);
(Continued)

(58) Field of Classification Search
CPC .. C04B 5/00; C04B 5/06; C04B 5/065; C03B 19/102
See application file for complete search history.

(56) References Cited

U.S. PATENT DOCUMENTS 2,321,674 A 6/1943 Harshberger
3,148,045 A 9/1964 Schott
(Continued)

FOREIGN PATENT DOCUMENTS

CA 1110072 10/1981
CA 1110072 A 10/1981
(Continued)

OTHER PUBLICATIONS

Wegener et al., "Novel High-Temperature Experimental Setup to Study Dynamic Surface Tension Phenomena in Oxide Melts", Ind. Eng. Chem. Res. Nov. 8, 2013, 52, pp. 16444-16456 (Year: 2013).*
(Continued)

Primary Examiner — Lisa L Herring
(74) Attorney, Agent, or Firm — Shumaker, Loop & Kendrick, LLP; James D. Miller

(57) ABSTRACT

A process for preparing solid slag granules from a molten slag composition comprises: (a) providing the molten slag composition; (b) converting the molten slag composition into the solid slag granules in a dispersion apparatus; and (c) sorting the solid slag granules by shape in a separator to produce a plurality of fractions having different sphericities. Granular slag products comprise one or more fractions of solid slag granules produced by the process, and include proppants, roofing granules, catalyst supports, which may be porous or non-porous, and coated or uncoated.

28 Claims, 5 Drawing Sheets

(51) Int. Cl.
  *C04B 20/10* (2006.01)
  *C21B 3/08* (2006.01)
  *C09K 8/80* (2006.01)
  *B01J 23/78* (2006.01)
  *C22B 7/04* (2006.01)
  *C04B 18/14* (2006.01)
  *C04B 103/00* (2006.01)
  *C04B 111/00* (2006.01)

(52) U.S. Cl.
  CPC .......... *C04B 20/1029* (2013.01); *C09K 8/80* (2013.01); *C21B 3/08* (2013.01); *C22B 7/04* (2013.01); *C04B 2103/0062* (2013.01); *C04B 2111/0081* (2013.01); *C04B 2111/00586* (2013.01); *Y02P 10/212* (2015.11); *Y02W 30/94* (2015.05)

(56) References Cited

U.S. PATENT DOCUMENTS

| | | | |
|---|---|---|---|
| 3,245,866 | A | 4/1966 | Schott |
| 3,491,147 | A | 1/1970 | Hickner |
| 3,594,142 | A | 7/1971 | Margesson et al. |
| 3,929,191 | A | 12/1975 | Graham et al. |
| 4,068,718 | A | 1/1978 | Cooke, Jr. et al. |
| 4,147,332 | A | 4/1979 | Kataro et al. |
| 4,359,434 | A | 11/1982 | Tiberg |
| 4,382,903 | A | 5/1983 | Larsson et al. |
| 4,493,875 | A | 1/1985 | Beck et al. |
| 4,585,064 | A | 4/1986 | Graham et al. |
| 4,680,230 | A | 7/1987 | Gibb et al. |
| 4,713,203 | A | 12/1987 | Andrews |
| 4,944,905 | A | 7/1990 | Gibb et al. |
| 5,422,183 | A * | 6/1995 | Sinclair ............... C09K 8/62  166/280.2 |
| 5,531,274 | A | 7/1996 | Bienvenu, Jr. |
| 5,944,861 | A * | 8/1999 | MacKenzie ........... C21B 3/08  65/19 |
| 6,116,342 | A | 9/2000 | Clark et al. |
| 7,135,231 | B1 | 11/2006 | Sinclair et al. |
| 7,216,711 | B2 | 5/2007 | Nguyen et al. |
| 7,459,209 | B2 | 12/2008 | Smith et al. |
| 7,654,323 | B2 | 2/2010 | Alary et al. |
| 7,721,804 | B2 | 5/2010 | Duenckel |
| 7,754,659 | B2 | 7/2010 | Rediger et al. |
| 7,883,740 | B2 | 2/2011 | Nguyen et al. |
| 8,227,026 | B2 | 7/2012 | McDaniel et al. |
| 8,420,578 | B2 | 4/2013 | Usova et al. |
| 8,440,727 | B2 | 5/2013 | Gradek |
| 8,496,057 | B2 | 7/2013 | Ferrero et al. |
| 8,603,578 | B2 | 12/2013 | Smith et al. |
| 2003/0010060 | A1* | 1/2003 | Roth ................ C21B 3/06  65/19 |
| 2008/0087136 | A1 | 4/2008 | Ek |
| 2009/0044941 | A1 | 2/2009 | De Paiva Cortes et al. |
| 2009/0193849 | A1 | 8/2009 | Oh |
| 2010/0032159 | A1 | 2/2010 | Saini et al. |
| 2012/0190597 | A1 | 7/2012 | Chatterjee et al. |
| 2012/0267096 | A1 | 10/2012 | Pershikova |
| 2012/0279703 | A1 | 11/2012 | McDaniel et al. |
| 2012/0283143 | A1 | 11/2012 | Hyde et al. |
| 2012/0325055 | A1* | 12/2012 | Gerold ............... B02C 15/00  75/749 |
| 2013/0056204 | A1 | 3/2013 | McDaniel et al. |
| 2013/0186624 | A1 | 7/2013 | McCrary et al. |
| 2013/0299397 | A1* | 11/2013 | DeJong ............. B07B 13/003  209/606 |
| 2014/0110111 | A1* | 4/2014 | Tanguay ............. C02F 1/001  166/280.2 |

FOREIGN PATENT DOCUMENTS

| | | | |
|---|---|---|---|
| KR | 20130001388 A * | 1/2013 | |
| SU | 1206245 A1 | 1/1986 | |
| SU | 1299990 A1 | 3/1987 | |
| WO | 2012151109 A1 | 11/2012 | |

OTHER PUBLICATIONS

KR20130001388A Google Machine Translation Performed Jun. 4, 2018. (Year: 2018).*
"Measurement of Properties of Proppants Used in Hydraulic Fracturing and Gravel-packing Operations", ANS/API Recommended Practice 19C First Edition, May 2008.
Emery et al., "Base Stabilization Using Pelletized Blast Furnace Slag", Journal of Testing and Evaluation, vol. 4, No. 1, Jan. 1976, pp. 94-100.
Cotsworth, "Use of Pelletized Slag in Concrete Masonry Units", Journal of Testing and Evaluation, vol. 6, No. 2, Mar. 1978, pp. 148-152.
Ando et al., "Development of Slag Blast Granulating Plant Characterized by Innovation of the Slag Treatment Method, Heat Recovery and Recovery of Slag as Resources", Mitsubishi Heavy Industries, Ltd., Technical Review Jun. 1985, pp. 136-142.
Ando et al., "Development of a BOF Slag Blast Granulating and Heat Recovery System", Mitsubishi Heavy Industries, Ltd., Technical Review Jun. 1981, pp. 1-9.
Oberto, Well Logging Handbook, 2008, p. 122.
Powers et al., "Comparision Charts for Estimating Roundness and Sphericity", The Geoscience Handbook, 2009, pp. 167-168.

* cited by examiner (A)  Ceramic Proppant (B) Slag Granule

GRANULATED SLAG PRODUCTS AND PROCESSES FOR THEIR PRODUCTION

CROSS-REFERENCE TO RELATED APPLICATION

This application is a United States national phase application based on PCT/CA2015/050209 filed Mar. 20, 2015, which claims priority to and the benefit of U.S. Provisional Patent Application No. 62/007,180 filed Jun. 3, 2014, the contents of which are incorporated herein by reference.

FIELD

The present disclosure relates to granulated slag products, including proppants, roofing granules and catalyst supports, and processes for their production.

BACKGROUND

Slag is a by-product of metal production processes conducted in metallurgical furnaces. Although the composition and quantity of slag produced is highly dependent on the specific process, slag typically comprises a mixture of metal oxides with silicon dioxide, and is produced in amounts ranging from roughly 10 percent to several times the amount of metal produced by the process.

During metal production, slag is present in the metallurgical furnace in molten form. The temperature of the slag depends on the process, but can be on the order of about 1500-1600 degrees Celsius. Molten slag is periodically tapped from the furnace and is typically allowed to air cool and solidify, with the heat being lost to the environment.

Solidified slag can be processed into a number of commercial products, such as concrete blends or fibrous insulation material, but large quantities of slag continue to be discarded as waste. There has been recent interest in the use of granulated slag as a proppant in oil and gas production, or as roofing granules. However, the costs involved in transporting, grinding and/or re-melting solidified slag for the production of such materials can make these uses economically unattractive.

In addition, the processes used to convert slag to products such as proppants or roofing granules are not entirely satisfactory, and can result in materials which do not meet one or more product requirements. For example, proppants are required to have specific properties of strength, size, shape and composition. It is difficult to produce slag granules having all the required properties of proppants while preserving the economic benefit of using slag, rather than other starting materials.

There remains a need for simple, economically feasible processes for converting slag to commercially viable granular products, and for granular products such as proppants and roofing granules produced by such processes.

SUMMARY

In an embodiment, there is provided a process for preparing solid slag granules from a molten slag composition. The process comprises: (a) providing the molten slag composition; (b) converting the molten slag composition into the solid slag granules in a dispersion apparatus; and (c) sorting the solid slag granules by shape in a separator to produce a plurality of fractions having different sphericities.

In another embodiment, there is provided a granular slag product comprising one or more of the fractions of solid slag granules produced by the process as defined herein. The granular slag product may comprise proppants, roofing granules, catalyst supports, may be porous or non-porous, and may be coated or uncoated.

In yet another embodiment, the dispersion apparatus comprises an atomization apparatus, and said step of converting the molten slag composition into the solid slag granules comprises atomizing the molten slag composition by contacting the molten slag composition with a gas stream in said dispersion apparatus. In some embodiments the gas stream comprises air.

In yet another embodiment, the atomization apparatus comprises a blower, and said atomizing of the molten slag composition comprises using said blower to blow said gas stream into a falling stream of said molten slag composition in said dispersion apparatus, thereby separating the falling stream of said molten slag composition into droplets which solidify to form said solid slag granules. In some embodiments, the blower is adapted to produce a maximum total pressure of less than about 80 inches of water.

In yet another embodiment, the solid slag granules are non-porous.

In yet another embodiment, at least one of the fractions produced by said sorting consists of said solid slag granules having an average sphericity of greater than 0.6. In some embodiments, the solid slag granules have an average sphericity and/or roundness of from 0.7 to about 0.9.

In yet another embodiment, at least one of the fractions produced by said sorting consists of said solid slag granules having an average sphericity of less than 0.6 which may include elongate granules. The elongate granules may include dumbbell-shaped granules and/or fractured dumbbell-shaped granules.

In yet another embodiment, the atomization apparatus further comprises an impact plate, and at least some of the solid slag granules are produced by droplets striking the impact plate, wherein said solid slag granules produced by droplets striking the impact plate have an average sphericity of less than 0.6.

In yet another embodiment, the process further comprises the step of sorting the solid slag granules by density.

In yet another embodiment, the process further comprises the step of mixing the molten slag composition with a density-reducing additive prior to and/or simultaneously with said step of converting the molten slag composition into the solid slag granules in the dispersion apparatus. The solid slag granules produced according to this embodiment may have internal voids. In some embodiments, the step of mixing the molten slag composition with the density-reducing additive comprises injecting the density-reducing additive into the molten slag composition. The density-reducing additive may be selected from the group comprising liquid water, steam, carbon, a metal carbonate, and mixtures of any two or more thereof. In some embodiments, the step of mixing the molten slag composition with a density-reducing additive comprises expanding the molten slag composition by injecting water and/or steam into the molten slag composition before the step of converting the molten slag composition into the solid slag granules.

In yet another embodiment, the process further comprises the step of coating at least some of the solid slag granules in a coating apparatus. In some embodiments, the coating step comprises coating the solid slag granules with a coating composition selected from the group comprising a resin composition and a ceramic composition. In some embodiments where at least one of the fractions produced by said sorting consists of said solid slag granules having an average sphericity of greater than 0.6, and where the coating composition comprises a resin composition, the coating step may be conducted after the step of sorting the solid slag granules by shape.

In some embodiments where the coating step comprises combining a resin composition with the solid slag granules, the solid slag granules are heated to a temperature sufficient to melt the resin composition, and the process further comprises tumbling the solid slag granules with the resin composition to produce polymer-coated slag granules.

In some embodiments where the coating step comprises combining a resin composition with the solid slag granules, the process may further comprise curing the resin composition during or after the coating step. The curing step may comprise crosslinking of the resin composition with a crosslinking activator, wherein the crosslinking activator is included in the resin composition.

In embodiments where at least one of the fractions produced by said sorting consists of said solid slag granules having an average sphericity of greater than 0.6, and at least one of the fractions produced by said sorting consists of said solid slag granules having an average sphericity of less than 0.6, the ratio of solid slag granules having an average sphericity of greater than 0.6 to solid slag granules having an average sphericity of less than 0.6 is controllable by adjustment of one or more of the following parameters: (a) the temperature of the molten slag composition; and (b) an angle between a gas stream and a falling stream of said molten slag composition, where the dispersion apparatus comprises an atomization apparatus.

In yet another embodiment, where the molten slag composition comprises free iron, and where the metallic iron is substantially completely oxidized during said atomizing of the molten slag composition, such that the solid slag granules are substantially non-magnetic.

In yet another embodiment, the process further comprises the steps of: (i) providing the molten slag composition in a metallurgical furnace; (ii) withdrawing the molten slag composition from the metallurgical furnace; (iii) while maintaining the molten slag composition at a sufficiently high temperature to prevent it from solidifying, transporting the molten slag composition to the dispersion apparatus. In some embodiments, the metallurgical composition of the molten slag composition remains constant after it is withdrawn from the furnace and until it is converted to said solid slag granules.

In yet another embodiment, the device for separating the granules by shape comprises a spiral separator.

In yet another embodiment, the molten slag composition is substantially free of lime.

In yet another embodiment, the molten slag composition is a non-ferrous slag.

In yet another embodiment, there is provided a granular slag product comprising one or more of the fractions of solid slag granules produced by the process as described herein, which may comprise gas atomization of a molten slag composition. The granular slag product may comprise roofing granules, a non-porous proppant, a porous granular slag product, a catalyst support, and/or a coated proppant. The granular slag product may comprise solid slag granules having an average sphericity of greater than 0.6; solid slag granules coated with a resin composition which is optionally cured or partially cured; and/or solid slag granules having an average sphericity of less than 0.6.

BRIEF DESCRIPTION OF THE DRAWINGS

The invention will now be described, by way of example only, with reference to the attached drawings, in which:

FIGS. 2A to 2D are photographs of coated and uncoated slag granules produced by a process as described herein, before and after crushing, wherein FIG. 2A shows uncoated 20/40 slag granules; FIG. 2B shows resin coated 20/40 slag granules; FIG. 2C shows resin coated 20/40 slag granules crushed at 10,000 psi; and FIG. 2D shows uncoated slag granules crushed at 10,000 psi (FIG. 2D);

DETAILED DESCRIPTION

Figure 1:
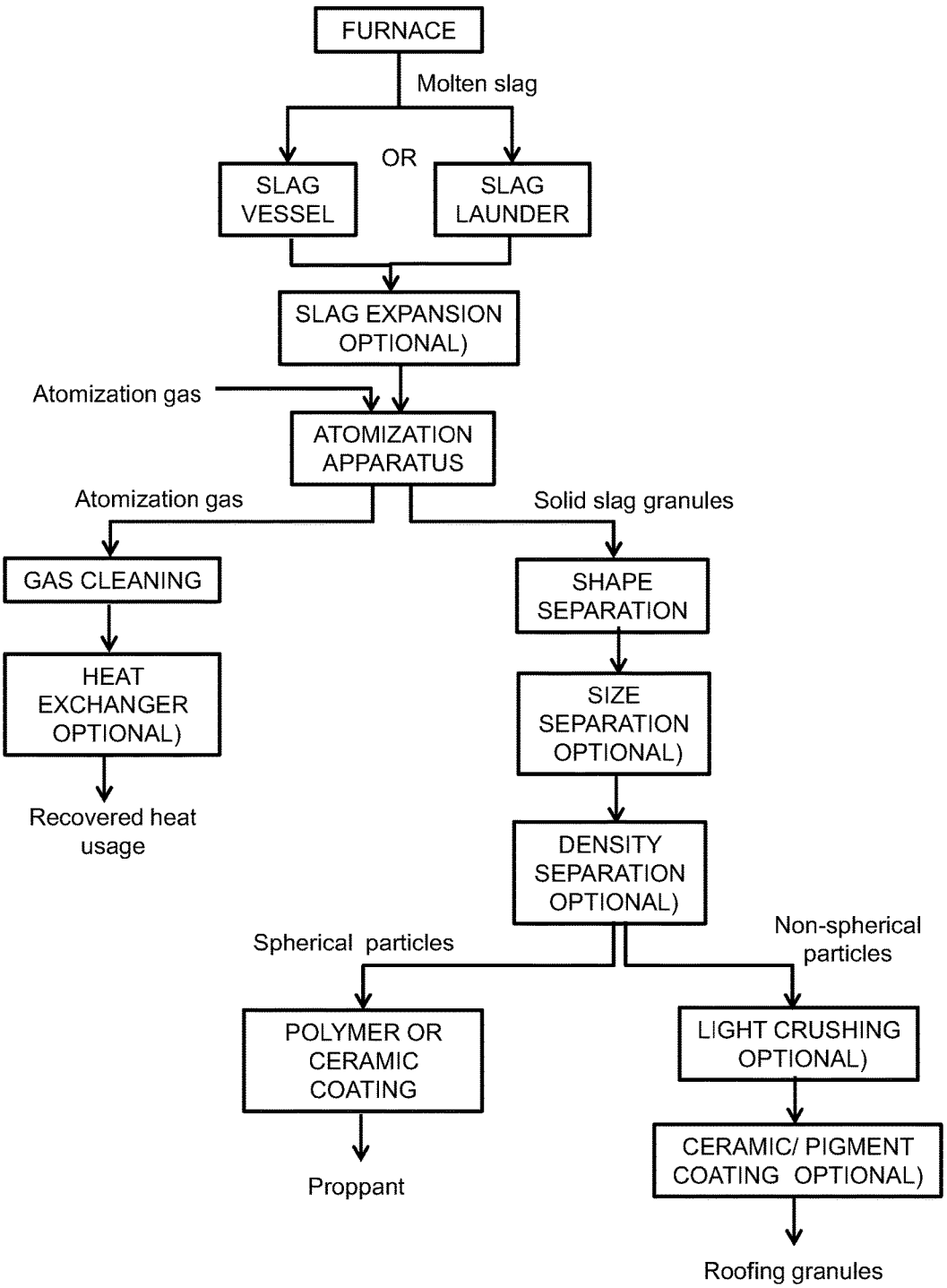
FIG. 1 is a schematic illustration of an embodiment of a process as described herein.

The following is a detailed description of processes for producing commercial granular products from slag compositions produced by metallurgical processes. Three types of granular products described herein are: proppants for oil and gas recovery, roofing granules and catalyst supports. Proppants are particles which are injected into hydraulic fractures induced in the area surrounding an oil or gas well so as to prevent the fractures from closing and to provide a porous pathway through which oil or gas may enter the well. Proppants are required to have a number of properties, including high compression strength, acid solubility resistance, resistance to leaching, and spherical shape.

Roofing granules are particles which are applied to asphalt shingles and siding, and which provide these building materials with their characteristic texture and appearance. Roofing granules are typically provided with ceramic coatings and pigments, which are applied in a kiln.

Slag granules can be used as catalyst supports for various types of catalysts, and may be coated with catalyst particles for this purpose. Alternatively, the granules themselves may be used as catalysts, depending on their composition. Where the catalyst is in the form of a porous bed of particles, sphericity and particle size distribution are important properties of slag granules used for this purpose. Porosity of the granules may also be important.

Although the following description is limited to the production of proppants, roofing granules and catalyst supports, it will be appreciated that the processes described herein can be applied to the production of a wide variety of granular products, including abrasives.

The starting materials used in the processes described herein are slag compositions. Typically these slag compositions are by-products from processes for metal production. Slag compositions for use in the processes described herein can have various compositions, depending on the processes from which they originate.

The slag compositions used herein can be ferrous or non-ferrous. Ferrous slags are produced in steelmaking and typically comprise lime, silicon dioxide, alumina and magnesia, and may also comprise free iron. Non-ferrous slags are produced in smelting processes for production of non-ferrous metal such as copper, nickel and lead. Non-ferrous slags may comprise varying amounts of silicon dioxide, iron oxide, magnesia and lime.

Where the slag granules described herein are used as roofing granules, it may be desired to avoid ferrous slags containing large amounts of lime, due to the tendency of the lime to combine with water to produce calcium hydroxide, which can reduce the weathering characteristics of the roofing or siding in which they are used. Therefore, slag which is non-ferrous and/or substantially free of lime is preferred where the slag granules are to be used as roofing granules.

To maximize efficiency in the production of granular products as described herein, it is desirable to avoid crushing and/or melting of slag which has previously been cooled and solidified. Therefore, in the embodiments described herein, a molten slag composition produced during a metal production process is withdrawn from a metallurgical furnace and is maintained in a molten state as it is transferred from the furnace to a dispersion apparatus. In this way, the process conserves the heat of the molten slag and reduces or eliminates the need to add heat energy for conversion of the molten slag to solid granules, and also eliminates the need to mechanically grind the slag. It will be appreciated, however, that a number of benefits of the processes described herein do not rely on conserving the heat of the molten slag, and that these benefits will be realized regardless of whether the heat of the molten slag is preserved, or whether the slag is permitted to cool and solidify prior to being re-melted and converted to solid granules.

FIG. 1 is a schematic diagram illustrating processes for producing proppants, roofing granules and/or catalyst supports.

Slag within the furnace is maintained in a molten state, at a temperature which is slightly above its melting temperature. The temperature of the molten slag depends on the specific process, but can be in the range from about 1500-1600 degrees Celsius in a steelmaking process, with the slag being superheated by about 40-150 degrees Celsius above its melting temperature. The temperature of the molten slag can range from about 1000-1700 degrees Celsius for non-ferrous slags. However, it will be appreciated that the slag temperature ranges mentioned herein are not limited, and depend on the process from which the slag originates.

Molten slag is periodically tapped from the furnace, and is tapped directly into a movable slag vessel or a slag launder or runner, in which the molten slag is transported to another area of the plant. During transport, the slag is maintained in a molten state. Slag is typically tapped on an intermittent basis.

In one embodiment, the molten slag is transferred from the slag vessel to a dispersion apparatus, where the molten slag is converted to solid slag granules. The dispersion apparatus may comprise either a pelletizing apparatus including a rotating drum, as described in U.S. Pat. Nos. 3,584,142 and 5,944,861, or an atomization apparatus. However, a pelletizing apparatus will typically produce slag granules with diameters ranging from about 0.15 to 13 mm, with the majority of the particles having diameters within the 1.5 to 10 mm range. Particles with these diameters are better suited for use as concrete aggregate.

The following description will focus on embodiments in which the dispersion apparatus is an atomization apparatus in which the molten slag is atomized by a gas stream, which may comprise air. Atomization produces slag granules with a smaller particle size and narrower particle size distribution than those produced by a pelletizer, the atomized particles being better suited for use as proppants and roofing granules.

The atomization apparatus may comprise a gas atomization plant which is located in close proximity to the metallurgical furnace, so that the slag may be maintained in a molten state as it is transferred from the furnace to the gas atomization plant. For example, the gas atomization plant and the furnace may be separated by a distance of less than about 1 km.

In the present embodiment, the molten slag is transferred directly from the furnace to the atomization apparatus, so as to minimize heat loss and solidification of the molten slag. In some embodiments, the molten slag does not undergo any intermediate processing such as addition of additives to alter the composition or properties of the molten slag. However, in other embodiments, the molten slag may be mixed with a density-reducing additive prior to and/or simultaneously with the conversion of the molten slag into solid slag granules inside the atomization apparatus.

For example, in some embodiments the density-reducing additive may be injected into the molten slag composition, and may be selected from one or more of liquid water, steam, carbon or a metal carbonate. Mixing the molten slag with a density-reducing additive expands the molten slag, and atomization of the expanded slag in the atomization apparatus results in the production of solid slag granules which have internal voids, and are therefore of lower density and greater porosity than solid slag granules which are produced without the use of density-reducing additives. The addition of water typically results in granules having internal voids and a non-porous outer surface, whereas the addition of carbon or metal oxides typically results in granules having internal voids and a porous outer surface. The ability to provide tailored density and porosity is advantageous in the production of proppants and catalyst supports.

For example, in an atomization apparatus, a density-reducing additive such as steam or liquid water may be incorporated into the gas stream in order to adjust the properties and/or the composition of the solid slag granules. Other possible additives include carbon and metal carbonates to alter density, porosity and/or composition of the solid slag granules. Also, metal oxides may be added to the gas stream to alter the composition of the slag granules.

In some embodiments, it may be advantageous to produce solid slag granules of low porosity for use as proppants, roofing granules and/or catalyst supports. For example, the inventors have found that gas-atomized slag granules, particularly those produced from a non-expanded molten slag composition, have low porosity. This can be advantageous in cases where the granules are subsequently coated, as in the case of roofing granules (ceramic and pigment coated in a kiln) and catalyst supports, or in the case of coated proppants, which are further discussed below. The low porosity is advantageous as it is expected to reduce the amount of coating material needed to provide a uniform coating.

In addition, the inventors have found that the gas atomization with an oxygen-containing gas such as air tends to oxidize any free metals in the slag, such as iron. The reduction or elimination of free iron in the slag granules is advantageous as it reduces the magnetic properties of the granules, and it reduces the tendency of the particles to rust. This is desirable for both proppants and roofing granules.

Inside the gas atomization plant, the molten slag is poured from the slag vessel or launder and is allowed to fall through an atomization chamber into which a gas stream is blown from a blower. When the gas stream contacts the molten stream of falling slag, the slag is simultaneously separated into droplets and cooled to a solid state, thereby forming solid slag granules which fall to the bottom of the chamber.

The gas input to the blower may comprise gas at ambient pressure rather than compressed gas, which is commonly used in prior art air atomization processes. The use of gas at ambient pressure allows the atomization apparatus to use a common blower rather than a relatively complicated, more costly compressed gas injection system. The blower may be of the type which produces a maximum total pressure of less than about 80 inches of water, or about 20 kPa.

Proppant particles are required to be spherical, having a sphericity of greater than about 0.60. The present process can be optimized so as to predominantly produce solid slag granules having a high sphericity, suitable for use as proppants. Parameters which can be adjusted to optimize the production of spherical particles include the temperature of the molten slag entering the atomization chamber; the angle of the gas stream relative to the falling stream of molten slag in the atomization chamber; the width of the launder relative to the width of the gas nozzle of the blower; and the gas/slag ratio.

The solid slag granules produced by the atomization apparatus are recovered for further processing into a commercial product. The low pressure atomization apparatus will produce a certain proportion of spherical granules (defined herein as having a sphericity greater than 0.60) and a certain proportion of non-spherical granules (defined herein as having a sphericity less than 0.60).

In order to maximize the production of spherical granules suitable for use as proppants, the present embodiment utilizes a shape separation step which separates the solid slag granules into at least two separate fractions. One of these fractions is predominantly comprised of spherical slag granules and another of the fractions is predominantly comprised of non-spherical slag granules. The inventors have found that this shape separation is capable of producing a granular slag product containing a proportion of highly spherical slag granules. For example, the recommended sphericity and roundness of proppant particles is 0.6, and is 0.7 for high strength proppants. The inventors have found that the spherical solid slag granules produced according to the present process have a sphericity and/or roundness as great as about 0.90 as defined by the Krumbein and Sloss chart, as shown in ANSI/API Recommended Practice 19C, First Edition, May 2008, entitled "Measurement of Properties of Proppants Used in Hydraulic Fracturing and Gravel-Packing Operations". Sphericity is related to how closely a particle approaches the shape of a sphere, i.e. how closely the surface area of a particle corresponds to the surface area of a sphere. Roundness is a measure of the sharpness of a particle's edges, regardless of the shape of the particle.

The inventors have also found that the solid slag granules produced by the present process have a high degree of roundness and high surface smoothness/low surface roughness. Surface roughness may be defined as arithmetic mean surface roughness (Ra), which is the average of the individual depths/heights from the mean elevation of the surface profile.

Figure 4:
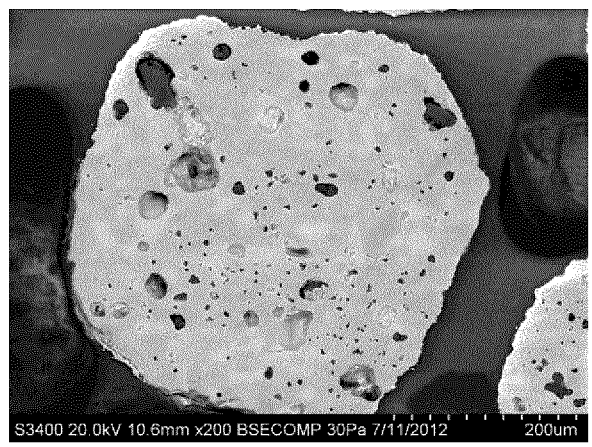
FIGS. 4A and 4B shows cross-sectional scanning electron microscopy images comparing the smoothness, sphericity and roundness of conventional ceramic proppant particle (FIG. 4A) with a slag granule produced according to a process as described herein (FIG. 4B).
Figure 4:
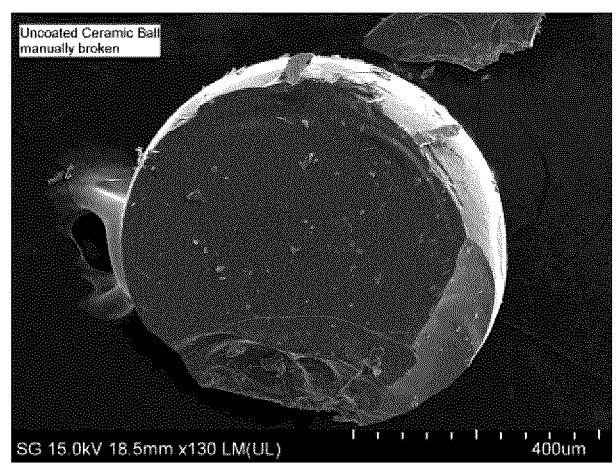

As can be seen from FIGS. 4A and 4B, the slag granules produced by the present process (FIG. 4B) may have improved smoothness, sphericity and roundness as compared to conventional ceramic proppant particles (FIG. 4A). These improved properties are expected to be particularly advantageous where the slag granules are used as proppants or catalyst supports, as they are expected to provide improved compressive strength and improve the porosity of beds of such particles. Also, the coating of such particles would be expected to consume smaller quantities of coating material. Improved roundness is also advantageous where the slag granules are used as roofing granules, as it reduces the likelihood that sharp edges of the particles will injure roofers during installation of shingles coated with the granules.

The shape separation step may be accomplished by a spiral separator, which may comprise a conventional dry spiral separator for separating spherical particles from non-spherical particles. The spiral separator is a simple apparatus, comprising a tower around which is wound an inwardly included helical trough having openings at its inside edge and a collection trough at its outside edge. The spherical particles accelerate to higher speed than the non-spherical particles. The spherical particles roll over the outside edge of the helix and are caught in the outer collection trough. Non-spherical particles roll toward the inside edge and fall through the slots to be collected at the bottom of the separator.

In addition to the shape separation step, it may be desired to conduct additional separations in order to maximize other properties of the granular product. For example, in addition to shape separation, it may be desirable to separate the solid slag granules on the basis of size. Size separation can produce fractions of solid slag granules having predetermined particle size distributions, which may be required for some applications.

In addition to shape separation, it may be desired to separate the solid slag granules on the basis of density. This can be accomplished, for example, by using a spiral separator, which may be the same separator used for shape separation. Alternatively, a density separation may be conducted by separating different fractions of slag granules on the basis of the distance traveled by the granules during the atomization process. As mentioned above, the gas stream from the blower will cause the molten slag to form droplets which solidify and fall to the floor of the atomization chamber. The gas stream is angled relative to the falling stream of molten slag, and therefore the slag granules will undergo horizontal displacement before they land on the floor of the chamber. The heavier or denser particles will tend to land closer to the blower, while lighter, less dense particles will be horizontally displaced by a greater distance from the blower. This density separation step can be useful in the production of certain products such as proppants. For example, the density separation can be used to exclude high density particles which may be too dense for use as a proppant. Also, the high density granules typically differ in composition from the lower density granules and may have a higher metal content than the lower density granules. Therefore, the density separation step can be used to separate out granules which have a chemical composition unsuitable for use as proppant, for example in terms of leach resistance, compression strength, etc. For roofing granules, it may be desired to exclude higher density granules containing free iron, since any free iron contained in the granules may rust and cause discoloration of the roofing granules, and also because the magnetic properties of free iron may cause the iron-containing granules to stick to equipment used in the production of roofing granules.

As mentioned above, the gas atomization of the molten slag produces at least one fraction of solid slag granules which are non-spherical. Non-spherical granules are particularly well suited for use as roofing granules. Even where the gas atomization process is optimized for production of spherical slag granules, a certain proportion of the slag granules will be non-spherical and suitable for use as roofing granules. For example, some of the droplets will solidify before becoming spherical, and will have an elongate form. Also, droplets may cling together to form non-spherical granules, or dumbbell-shaped elongate granules may be formed by the deformation of incompletely solidified granules. The conditions of gas atomization mentioned above can be adjusted so as to maximize the production of non-spherical particles.

In addition, an impact plate may be placed in the atomization chamber, in the path of the droplets created by the gas atomization. The liquid or partially solidified droplets will strike the plate, causing them to be deformed and/or fractured into non-spherical shapes which are suitable for use as roofing granules. The solidified non-spherical granules are recovered from the atomization chamber and may be subjected to any of the shape, size or density separation steps mentioned above in order to maximize certain properties of the non-spherical solid slag granules. For example, shape separation can be used to maximize the proportion of non-spherical granules present in the product.

Where the non-spherical slag granules include a significant proportion of elongate slag granules, such as dumbbell-shaped granules, the process may include a light crushing step to fracture these particles. The fracturing of the particles to produce cleaved edges may be desired where the granules are used as roofing granules.

As will be appreciated, a large quantity of heat from the molten slag is transferred to the gas used for atomization of the slag. Thus, the gas atomization step produces a high temperature gas stream. This heated gas may be used elsewhere in the metal production process, or the heat energy may be extracted from the heated gas. In this regard, the process may further comprise the step of passing the heated gas from the atomization apparatus through a heat exchanger to recover at least a portion of the heat lost by the molten slag during the atomizing step.

When used as roofing granules, the non-spherical slag granules will undergo further processing during the manufacture of asphalt-based roofing or siding materials. These further processing steps include the ceramic and/or pigment coating of the solid slag granules in a kiln.

Figure 3:
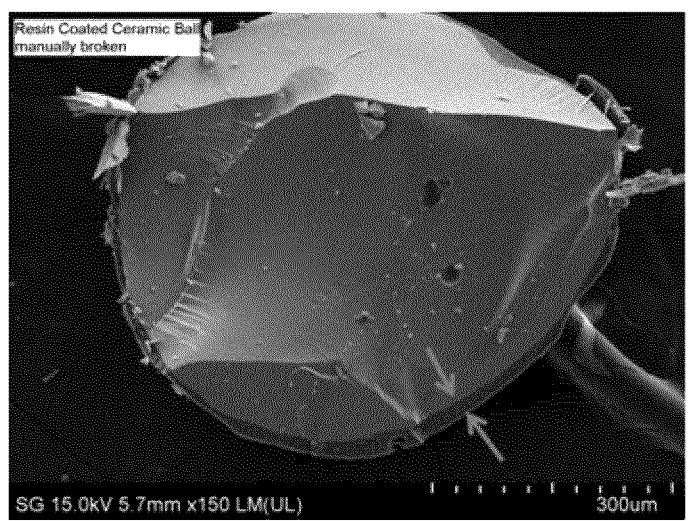
FIG. 3 shows a cross-sectional scanning electron microscopy image of a resin coated slag granule.

After being recovered from the atomization apparatus, and optionally separated, the spherical slag granules to be used as proppants may be provided with a coating comprised of a resin material or a ceramic material. The coating of the spherical slag granules is performed in a coating plant, and typically involves mixing the spherical slag granules with the coating material in a tumbling or mixing apparatus, so as to provide the granules with a uniform layer of the coating material. FIG. 3 shows a cross-sectional scanning electron microscopy image of a resin coated slag granule.

In the case of a resin coating, a resin composition is combined with the slag granules in a coating apparatus, such as a coating plant, with the granules being heated so as to melt the resin and allow it to coat the granules. The resin composition includes a resin which may comprise a polymer, pre-polymer, monomer and/or oligomer. In some embodiments, the granules are cooled to ambient temperature after the gas atomization step, and are then re-heated in the coating apparatus. To further reduce energy consumption, some embodiments of the process may utilize the residual heat of the solidified slag granules recovered from the atomization apparatus. Where it is desired to take advantage of the residual heat of the solidified slag granules, the coating apparatus will be located in close proximity to the atomization apparatus, so that the solid slag granules can be transported from the atomization apparatus to the coating apparatus before the residual heat is dissipated to the surroundings.

If desired, the resin coating may be crosslinked after it is applied to the solid slag granules, for example by combining a crosslinking activator or agent with the resin composition and the slag granules in the coating apparatus.

Resin coating of the slag granules serves several purposes. As mentioned above, proppants are required to possess a certain resistance against leaching, particularly in acidic environments. A resin coating may be applied to the solid slag granules in order to increase their resistance to acid solubility. The resin coating can also be used to alter and tailor the density of the solid slag granules to specific applications, and will typically decrease the density of the slag granules.

The inventors have also found that resin coating of the slag granules can increase their compression strength, and reduce their tendency to produce fines when compressed to the point of breaking. The generation of fines is an undesirable property of proppant particles, since the fines will tend to fill the spaces between the proppant particles, destroying the porosity of the fracture occupied by the proppant, and reducing the conductivity of the proppant pack.

In accordance to industry accepted recommended practice for man-made proppants (API RP 19C and ISO 13503-2), proppants in a given size range should generate less than a given percentage of fines at given compression stresses. Fines are defined by API RP 19C and ISO 13503-2 as particles with dimensions smaller than the smallest mesh size of the proppant designation. For example, for 20/40 mesh proppant (0.425-0.850 mm), fines are defined as particles that pass 40 mesh (<0.425 mm).

When the polymer coated slag granules produced by the present process are compressed to the point of breaking, the inventors have found that the level of fines generation is lower than the industry recommended level of fines, and that the coated granules generate fewer and larger fractured products than equivalent uncoated slag granules. Thus, the resin coated slag granules produced by the present process are more resistant to fracturing, and when compressed to the point of breaking, are more likely to preserve the porosity of the fracture in which they are inserted.

EXAMPLES

A number of properties of resin-coated spherical slag granules produced according to the present process were tested, to determine the suitability of the granules for use as proppants in accordance with industry accepted recommended practice, based on ISO 13503-2 or API RP 19C.

Spherical slag granules produced according to the present process were heated and resin coated with a phenolic resin, with the ratio of phenolic resin to slag granules being 3.3% by weight. The resin coating was crosslinked using hexamethylenetetramine (HEXA), with the ratio of HEXA to slag granules being 1.6% by weight.

Sieve testing of the coated slag granules in accordance with API RP 19C showed that the coated granules met the requirements of a "20/40" proppant, whereby a minimum of 90% of the tested sample should have a sieve size between Mesh size 20 and Mesh size 40, that is between 422 microns and 853 microns. Over 98% of the coated granules according to the present process had a sieve size within this range.

The coated slag granules were subjected to a crush analysis in accordance with API RP 19C to assess the generation of fines under compression. The suggested maximum allowable fines for 20/40 proppant is 10% at test compression stress levels of 7,500, 10,000, 12,500 and 15,000 psi. As shown in Table 1 below, the coated slag granules according to the present process generated less than 10% fines at each of these compression stress levels.

TABLE 1

| Load Stress (psi) | Percentage Fines (%) |
|---|---|
| 7,500 | 2.1 |
| 10,000 | 2.5 |
| 12,500 | 5.8 |
| 15,000 | 9.2 |

Figure 2A:
Figure 2B:
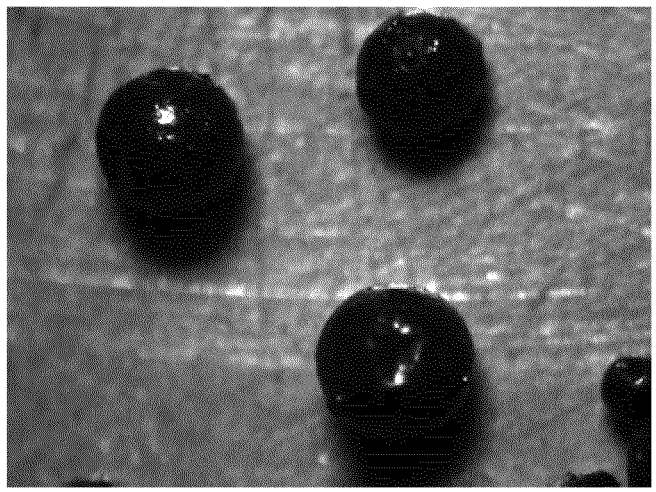
Figure 2C:
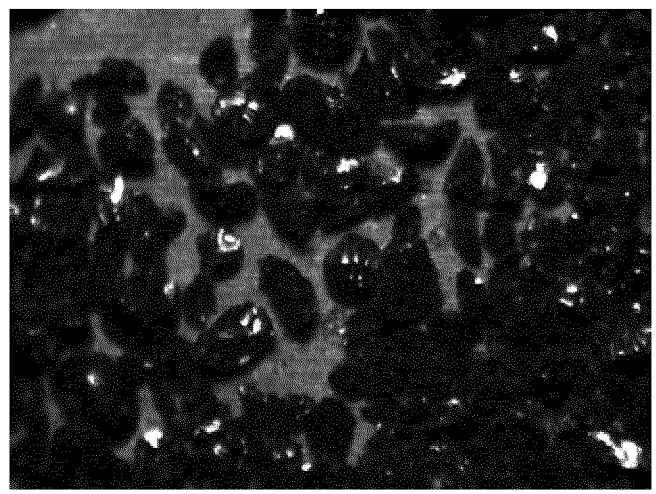
Figure 2D:
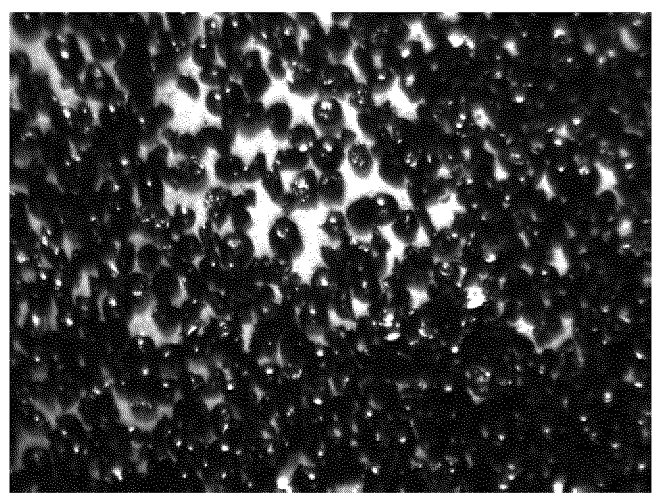

The uncoated slag granules were also tested by crush analysis at 10,000 psi, in accordance with API RP 19C, and were found to generate 30.2% fines, as compared to 2.5% for the resin coated granules. In addition to reduced generation of fines, the inventors found that the fragments generated by crushing of the resin coated slag granules are larger than those generated by crushing of uncoated slag granules. This can be seen from FIGS. 2A to 2D, which shows uncoated 20/40 slag granules (FIG. 2A), resin coated 20/40 slag granules (FIG. 2B), resin coated 20/40 slag granules crushed at 10,000 psi (FIG. 2C) and uncoated slag granules crushed at 10,000 psi (FIG. 2D).

The reduced amount and increased size of fragments generated by crushing of the coated slag granules is expected to have a beneficial effect in maintaining porosity and conductivity of a fracture propped open by resin coated slag granules produced by the present process.

The recommended maximum acid solubility for ceramic proppants and resin coated proppants is 7%. The acid solubility of the uncoated and coated slag granules according to the present process was tested in accordance with API RP 19C with 12:3 HCl:HF at 150 degrees Fahrenheit for 30 minutes. The uncoated slag granules exhibited an acid solubility of about 14.3%, whereas the coated slag granules exhibited an acid solubility of about 7.7 percent, which is acceptable to the industry.

As already mentioned above, recommended sphericity and roundness of proppants is 0.6 or greater, and is 0.7 or greater for high strength proppants. The resin coated slag granules according to the present process had a sphericity and a roundness of 0.9, as determined in accordance with API RP 19C.

The turbidity of the slag granules was tested before and after resin coating, in accordance with API RP 19C. The uncoated granules had a turbidity of 550 FTU, while the coated granules had a turbidity of 110 FTU. The suggested maximum proppant turbidity is less than or equal to 250 FTU.

Although the invention has been described with reference to certain specific embodiments, it is not limited thereto. Rather, the invention includes all embodiments which may fall within the scope of the following claims.

What is claimed is:

1. A process for preparing solid slag granules from a molten slag composition, comprising:
   (a) providing the molten slag composition;
   (b) converting the molten slag composition into the solid slag granules in a dispersion apparatus; and
   (c) sorting the solid slag granules by shape in a separator to produce a plurality of fractions having different sphericities, wherein at least one of the fractions produced by said sorting consists of said solid slag granules having an average sphericity of greater than 0.6, wherein at least one of the fractions produced by said sorting consists of said solid slag granules having an average sphericity of less than 0.6, and wherein a ratio of said solid slag granules having an average sphericity of greater than 0.6 to said solid slag granules having an average sphericity of less than 0.6 is controllable by adjustment of one or more of the following parameters:
   (a) the temperature of the molten slag composition; and
   (b) an angle between a gas stream and a falling stream of said molten slag composition, where the dispersion apparatus comprises an atomization apparatus.

2. The process of claim 1, wherein the dispersion apparatus comprises an atomization apparatus, and said step of converting the molten slag composition into the solid slag granules comprises atomizing the molten slag composition by contacting the molten slag composition with a gas stream in said dispersion apparatus.

3. The process of claim 2, wherein the atomization apparatus comprises a blower, and said atomizing of the molten slag composition comprises using said blower to blow said gas stream into a falling stream of said molten slag composition in said dispersion apparatus, thereby separating the falling stream of said molten slag composition into droplets which solidify to form said solid slag granules.

4. The process of claim 3, wherein the blower is adapted to produce a maximum total pressure of less than about 80 inches of water.

5. The process of claim 3, wherein the solid slag granules are non-porous.

6. The process of claim 3, wherein the atomization apparatus further comprises an impact plate, and at least some of the solid slag granules are produced by droplets striking the impact plate, wherein said solid slag granules produced by droplets striking the impact plate have an average sphericity of less than 0.6.

7. The process claim 3, wherein the molten slag composition comprises free iron, and wherein the metallic iron is substantially completely oxidized during said atomizing of the molten slag composition, such that the solid slag granules are substantially non-magnetic.

8. The process of claim 2, wherein the gas stream comprises air.

9. The process of claim 1, wherein at least one of the fractions produced by said sorting consists of said solid slag granules having an average sphericity and/or roundness of from 0.7 to about 0.9.

10. The process of claim 1, wherein said at least one fraction having an average sphericity of less than 0.6 includes elongate granules.

11. The process of claim 10, wherein the elongate granules include dumbbell-shaped granules and/or fractured dumbbell-shaped granules.

12. The process of claim 1, further comprising a step of sorting the solid slag granules by density.

13. The process of claim 1, further comprising a step of mixing the molten slag composition with a density-reducing additive prior to and/or simultaneously with said step of converting the molten slag composition into the solid slag granules in the dispersion apparatus.

14. The process of claim 13, wherein the step of mixing the molten slag composition with the density-reducing additive comprises injecting the density-reducing additive into the molten slag composition.

15. The process of claim 13, wherein the density-reducing additive is selected from the group comprising liquid water, steam, carbon, a metal carbonate, and mixtures of any two or more thereof.

16. The process of claim 15, wherein the step of mixing the molten slag composition with a density-reducing additive comprises expanding the molten slag composition by injecting water and/or steam into the molten slag composition before the step of converting the molten slag composition into the solid slag granules.

17. The process of claim 13, wherein the solid slag granules have internal voids.

18. The process of claim 1, further comprising a step of coating at least some of the solid slag granules in a coating apparatus.

19. The process of claim 18, wherein the coating step comprises coating the solid slag granules with a coating composition selected from the group comprising a resin composition and a ceramic composition.

20. The process of claim 19, wherein at least one of the fractions produced by said sorting consists of said solid slag granules having an average sphericity of greater than 0.6, wherein the coating composition comprises a resin composition, and
wherein the coating step is conducted after the step of sorting the solid slag granules by shape.

21. The process of claim 19, wherein the coating composition comprises a resin composition, wherein the coating step comprises combining the resin composition with the solid slag granules, wherein the solid slag granules are heated to a temperature sufficient to melt the resin composition, and wherein the process further comprises tumbling the solid slag granules with the resin composition to produce polymer-coated slag granules.

22. The process of claim 19, wherein the coating composition comprises a resin composition, and wherein the process further comprises curing the resin composition during or after the coating step.

23. The process of claim 22, wherein the curing step comprises crosslinking of the resin composition with a crosslinking activator, wherein the crosslinking activator is included in the resin composition.

24. The process of claim 1, further comprising the steps of:
(i) providing the molten slag composition in a metallurgical furnace;
(ii) withdrawing the molten slag composition from the metallurgical furnace;
(iii) while maintaining the molten slag composition at a sufficiently high temperature to prevent it from solidifying, transporting the molten slag composition to the dispersion apparatus.

25. The process of claim 24, wherein a metallurgical composition of the molten slag composition remains constant after it is withdrawn from the metallurgical furnace and until it is converted to said solid slag granules.

26. The process of claim 1, wherein the separator comprises a spiral separator.

27. The process of claim 1, wherein the molten slag composition is substantially free of lime.

28. The process of claim 1, wherein the molten slag composition is a non-ferrous slag.

* * * * *